US012748014B2

United States Patent
Jiang et al.

(12) United States Patent
(10) Patent No.: US 12,748,014 B2
(45) Date of Patent: Sep. 29, 2026

(54) INTELLIGENT CONCRETE, SELF-SENSING METHOD FOR INTELLIGENT CONCRETE, EQUIPMENT AND STORAGE MEDIA

(71) Applicant: Wuhan University of Technology, Wuhan (CN)

(72) Inventors: Desheng Jiang, Wuhan (CN); Fazhou Wang, Wuhan (CN); Shan Jiang, Wuhan (CN); Lixin Wang, Wuhan (CN); Yimin Xu, Wuhan (CN); Sheng Li, Wuhan (CN); Lina Yue, Wuhan (CN); Dian Fan, Wuhan (CN); Lei Dong, Wuhan (CN); Ke Song, Wuhan (CN)

(73) Assignee: Wuhan University of Technology, Wuhan (CN)

( * ) Notice: Subject to any disclaimer, the term of this patent is extended or adjusted under 35 U.S.C. 154(b) by 0 days.

(21) Appl. No.: 19/058,276

(22) Filed: Feb. 20, 2025

(65) Prior Publication Data

US 2025/0362198 A1 Nov. 27, 2025

(30) Foreign Application Priority Data

Mar. 11, 2024 (CN) ........................ 202410268508.3

(51) Int. Cl.
*G01M 5/00* (2006.01)

(52) U.S. Cl.
CPC ........ *G01M 5/0066* (2013.01); *G01M 5/0033* (2013.01); *G01M 5/0041* (2013.01)

(58) Field of Classification Search
CPC ............. G01M 5/0066; G01M 5/0033; G01M 5/0041; G01N 33/383; G01D 21/02; C04B 28/00; C04B 28/04
See application file for complete search history.

(56) References Cited

U.S. PATENT DOCUMENTS

2021/0340963 A1* 11/2021 Muñoz Babiano ..... F03D 17/00

FOREIGN PATENT DOCUMENTS

CN 101526409 A * 9/2009
CN 109974867 A * 7/2019 ......... G05B 19/0428
(Continued)

OTHER PUBLICATIONS

Chrysanthos Maraveas and Thomas Bartzanas, "Sensors for Structural Health Monitoring of Agricultural Structures", Jan. 5, 2021. (Year: 2021).*
(Continued)

*Primary Examiner* — Octavia Hollington
(74) *Attorney, Agent, or Firm* — Hemisphere Law, PLLC

(57) ABSTRACT

A self-sensing method for intelligent concrete, device and storage medium, which includes: concrete and long-distance, large-capacity and multi-parameter optical fiber sensing cables embedded in the concrete; the intelligent concrete is used for all-round self-sensing of the external state and internal health state. A grating sensing network formed by the optical fiber sensing cable is embedded into the concrete like a neural network, enabling the intelligent concrete to have large-area and all-domain self-sensing capabilities, which can be used in fields such as highways, airports and bridges. At the same time, the optical fiber sensing cable has no probes and is not prone to damage during use. Further, by setting the multi-parameter optical fiber sensing cable, the dimension of the measurement parameters is increased, thereby improving the accuracy of monitoring the external state and internal health state.

4 Claims, 7 Drawing Sheets

(56) References Cited

FOREIGN PATENT DOCUMENTS

| | | | | | |
|---|---|---|---|---|---|
| CN | 114575927 A | * | 6/2022 | .............. | E21F 17/00 |
| CN | 115808468 A | | 3/2023 | | |
| CN | 218812902 U | * | 4/2023 | | |
| CN | 116226685 A | | 6/2023 | | |
| CN | 219908578 U | | 10/2023 | | |
| CN | 117451227 A | * | 1/2024 | ............... | E04C 3/26 |

OTHER PUBLICATIONS

Feng Jin-long, et al., On Design of the Detection System for Icy Highway Pavement Based on CC2430, Journal of Wuhan Vocational and Technical College, 2016, p. 58-61, vol. 15 issue 1.
CNIPA, Notification of a Third Office Action for CN202410268508.3, May 23, 2024.
Wuhan University of Technology (Applicant), Replacement claims (allowed) of CN202410268508.3, Jun. 13, 2024.
CNIPA, Notification to grant patent right for invention in CN202410268508.3, Jul. 8, 2024.

* cited by examiner

INTELLIGENT CONCRETE, SELF-SENSING METHOD FOR INTELLIGENT CONCRETE, EQUIPMENT AND STORAGE MEDIA

FIELD OF THE DISCLOSURE

The invention relates to the fields of structural testing and perception technology, especially the field of concrete state perception technology.

BACKGROUND

Concrete is the most extensively utilized man-made material on a global scale. Concrete buildings have become an important symbol of modern civilization. Concrete is ubiquitous and irreplaceable, making significant contributions to the rapid economic development and urban modernization of China. It is an essential cornerstone of national development. However, the existing concrete is a structural material and does not have the perception function. With the needs of the digitization and intelligent development of infrastructure, concrete materials are in urgent need of new sensing means and digital solutions to realize the transformation from structural materials to functional materials.

Some researchers have found that adding an appropriate amount of carbon fiber to cement-based materials can not only significantly improve the strength and toughness of concrete, but also the resistance change corresponds to the internal structure change. It can be used as a sensor and reflect its own force and internal damage conditions in the form of electrical signals. However, this technology has poor environmental adaptability and is difficult to be applied in engineering. Other researchers have directly embedded electrical (piezoelectric ceramic) or optical fiber sensors (fiber grating sensor) into concrete to monitor local conditions using point sensors. This not only makes construction difficult, expensive, and difficult to be widely promoted, but also has a single measurement parameter and limited functions. Therefore, the difficulties in achieving the digitization and intelligence of concrete are as follows: 1. Concrete structures are usually large in volume and wide in area, such as long linear application scenarios like highway pavement, subway track slabs, and airport runway pavement. The local detection of point sensors is difficult to achieve full domain intelligence, and point sensors can only locally perceive the internal state; 2. The external state and internal health state of concrete are closely related to many parameters such as strain, vibration, temperature, and humidity. A single parameter sensing method is difficult to achieve intelligent functions; 3. The working environment of concrete is harsh, and high long-term durability requirements are imposed on sensors; 4. There are many types of concrete, such as plain concrete, reinforced concrete, and prestressed concrete, each with different structures and requirements. Construction difficulties will limit the large-scale application of the technology.

Therefore, it is urgent to propose an intelligent concrete, the self-sensing method for intelligent concrete, equipment and storage medium to solve the above technical problems.

SUMMARY

In view of this, it is necessary to provide an intelligent concrete, self-sensing method for intelligent concrete, device and storage medium, in order to solve the technical problem existing in the existing technology that it is difficult to achieve long-distance, large-capacity and multi-parameter self-sensing of the external state and internal health state of intelligent concrete.

In one aspect, the present invention provides an intelligent concrete, including concrete and long-distance, large-capacity and multi-parameter optical fiber sensing cables embedded in the concrete; the intelligent concrete is used for all-round self-sensing of the external state and internal health state.

In some possible embodiment methods, the optical fiber sensing cables include vibration optical fiber sensing cable, strain optical fiber sensing cable, temperature optical fiber sensing cable and humidity optical fiber sensing cable.

In another aspect, the present invention also provides a self-sensing method for intelligent concrete, which is the intelligent concrete in any of the above possible embodiment, the self-sensing method for intelligent concrete comprises:

- obtaining historical all-domain multi-parameter optical fiber sensing data of the intelligent concrete;
- determining the first association between the external state and sensing data based on the historical all-domain multi-parameter optical fiber sensing data;
- determining variation trend of the sensing data based on the historical all-domain multi-parameter optical fiber sensing data, and determining the second correlation between the internal health states and the variation trend of the sensing data;
- obtaining real-time multi-parameter optical fiber sensing data of the intelligent concrete, and determining the external state based on the real-time multi-parameter optical fiber sensing data and the first correlation, determining the internal health state based on the real-time multi-parameter optical fiber sensing data and the second correlation.

In some possible embodiment methods, determining the first association between the external state and sensing data based on the historical all-domain multi-parameter optical fiber sensing data comprises:

- obtaining historical external state corresponding to the historical all-domain multi-parameter optical fiber sensing data;
- determining the first correlation based on the historical all-domain multi-parameter optical fiber sensing data and the historical external state.

In some possible embodiment methods, the external state includes external loads and surface conditions, the external loads include at least one of water load, traffic load, wind load and temperature load, the surface conditions include at least one of icing state, melting state and surface damage, the internal health state includes at least one of internal dislocation, internal void, material aging and loss of prestress.

In some possible embodiment methods, the historical all-domain multi-parameter optical fiber sensing data includes historical all-domain vibration sensing data and historical all-domain temperature sensing data, and the first correlation is the correlation between the all-domain vibration sensing data, the all-domain temperature sensing data and the freezing state.

In some possible embodiment methods, the historical all-domain multi-parameter optical fiber sensing data includes multiple historical all-domain sensing sub-data corresponding to the data sampling interval, then determining variation trend of the sensing data based on the historical all-domain multi-parameter optical fiber sensing data, and determining the second correlation between the internal health states and the variation trend of the sensing data comprises:

determining the variation trend of the sensing data based on the multiple historical all-domain sensing sub-data;

obtaining multiple internal states corresponding to the multiple historical all-domain sensing sub-data, and determining variation trend of the multiple internal states;

determining the second correlation based on the variation trend of the sensing data and the variation trend of the multiple internal states.

In some possible embodiment methods, the method also comprises:

determining whether the internal health state is a warning states, when the internal health states is a warning states, generate a warning signal.

In another aspect, the present invention also provides a self-sensing device of intelligent concrete, including a memory and a processor, wherein, the memory is used for storing programs;

the processor, coupled with the memory, is used to execute the program stored in the memory to implement the steps in the self-sensingness method of the intelligent concrete as described in any of the above possible embodiment.

In another aspect, the present invention also provides a computer-readable storage medium for storing computer-readable programs or instructions. When the programs or instructions are executed by the processor, they can implement the steps of the self-sensingness method of intelligent concrete in any of the above possible embodiment.

The beneficial effect of adopting the above embodiments method are: the intelligent concrete provided by the present invention embeds long-distance, large-capacity and multi-parameter optical fiber sensing cables in the concrete, similar to implanting sensory nerve optical cables in the concrete, enabling the intelligent concrete to have all-domain self-sensingness.

Secondly, compared with the single-point and local embedded sensors in the existing technologies, the intelligent concrete proposed by the present invention does not require digging holes to embed sensors. The deployment method is simple and it is more suitable for large-area, large-capacity and large-volume concrete structures. Moreover, the single-point and local embedded sensors are sensors with probe structures, which need to be welded and processed. They are prone to damage during use, while the optical fiber sensing optical cable embedded in the concrete of the present invention has no probe structure and is not prone to damage.

Further, by setting the multi-parameter optical fiber sensing cables embedded in the concrete, compared with the measurement of a single parameter in the existing technology, the invention can sense multiple parameters such as vibration, strain, temperature, and humidity, increasing the dimension of the measured parameters, and thereby further improving the accuracy of monitoring the external state and internal health status.

To sum up, the intelligent concrete proposed by the present invention can be applied to large-area and large-volume concrete structures such as highways, airports, bridges, and dams, providing a solution to the difficulties and pain points that the existing technology cannot achieve all-domain monitoring due to the single-point and local sensor deployment methods. It has good prospects for engineering applications.

BRIEF DESCRIPTION OF THE FIGURES

To describe the technical solutions in embodiments of the present invention more clearly, the following briefly introduces the accompanying drawings for describing the embodiments. Apparently, the accompanying drawings in the following description show merely some embodiments of the present invention, and those skilled in the art may still derive other accompanying drawings from these accompanying drawings without making creative efforts.

DETAILED DESCRIPTION

The following clearly and completely describes the technical solutions in the embodiments of the present invention with reference to the accompanying drawings in the embodiments of the present invention. Apparently, the embodiments described are merely a part rather than all of the embodiments of the present invention. Based on the embodiments in the present invention, all other embodiments obtained by those skilled in the art without making creative efforts shall fall within the scope of protection of the present invention.

It should be understood that the schematic drawings are not drawn in proportion to physical objects. Flowcharts used in the present invention show operations implemented according to some embodiment of the present invention. It should be understood that the operations of the flowcharts can be implemented out of order, and the steps without a logical contextual relationship may be implemented in reverse order or implemented at the same time. In addition, under the guidance of the content of the present invention, those skilled in the art can add one or more other operations to each flowchart, and can also remove one or more operations from each flowchart. Some of block diagrams shown in the accompanying drawings are functional entities and do not necessarily have to correspond to physically or logically separate entities. These functional entities may be implemented in software, or implemented in one or more hardware modules or integrated circuits, or implemented in different network and/or processor systems and/or microcontroller systems.

The reference to "Embodiment" herein means that a particular feature, structure, or characteristic described with reference to the embodiment may be included in at least one embodiment of the present invention. The appearances of the phrases in various place in the specification may not refer to a same embodiment, or an independent or a candidate embodiment that is mutually exclusive of other embodiment. Those skilled in the art explicitly and implicitly understand that the embodiment described herein may be combined with other embodiment.

The description of "first", "second" involved in the embodiment of the present invention are for descriptive purposes only, and cannot be understood to indicate or imply relative importance or implicitly indicate the quantity of indicated technical features. Therefore, the technical features defined by "first" and "second" may explicitly or implicitly include at least one such feature.

The present invention provides an intelligent concrete, self-sensing method for intelligent concrete, equipment and storage media, which are described separately.

Figure 1:
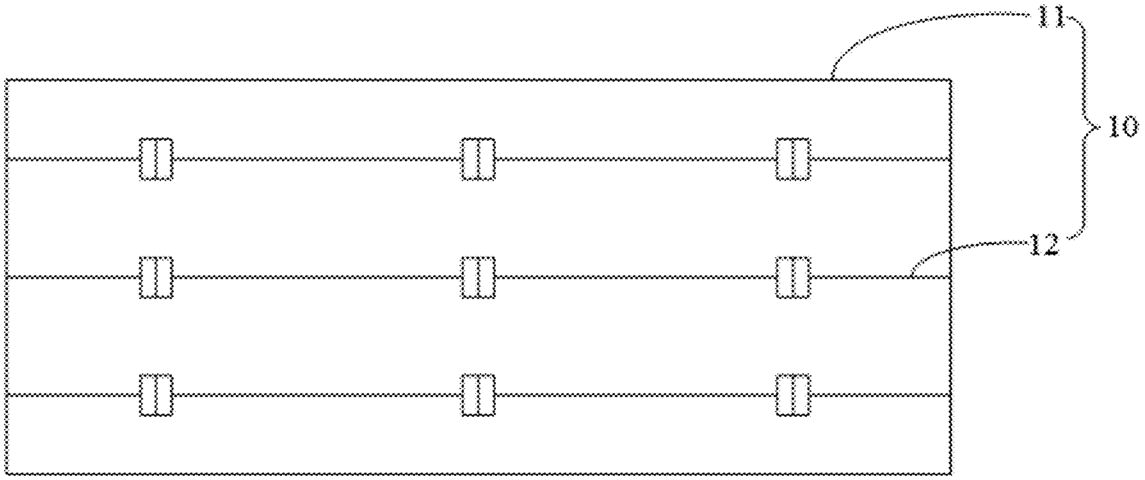
FIG. 1 is a schematic diagram of the structure of the intelligent concrete provided by the present invention.

FIG. 1 is a schematic diagram of an intelligent concrete, as shown in FIG. 1, the intelligent concrete 10 includes concrete 11 and long-distance, large-capacity, and multi-parameter optical fiber sensing cables 12 embedded in the concrete 11. The intelligent concrete 10 is used for the all-domain self-sensing of the external state and internal health state.

Compared with the existing technologies, the intelligent concrete 10 provided by the embodiment of the present invention embeds the long-distance, large-capacity and multi-parameter optical fiber sensing cables 12 into the concrete 11, and implants the grating sensing network formed by the optical fiber sensing cables 12 into the concrete 11 like a neural network, enabling the intelligent concrete 10 to have the ability of all-domain self-sensing (all-domain self-sensing of external state and internal health state), providing new technologies and means for intelligence in fields such as highways, airports and bridges.

Secondly, compared with the single-point and local embedded sensors in the existing technologies, the intelligent concrete 10 proposed by the present invention does not require digging holes to embed sensors. The deployment method is simple and it is more suitable for large-area, large-capacity and large-volume concrete structures. Moreover, the single-point and local embedded sensors are sensors with probe structures and the probes need to be welded. They are prone to damage during use. However, the optical fiber sensing cables 12 embedded in the concrete by the present invention has no probe structure and is not prone to damage.

Further, by setting the multi-parametric optical fiber sensing cables 12 embedded in the concrete 11, compared with the measurement of a single parameter in the existing technology, the invention can perceive multiple parameters such as vibration, strain, temperature, and humidity, thereby increasing the dimension of the measured parameters and further enhancing the accuracy of monitoring the external state and internal health state.

To sum up, the intelligent concrete 10 proposed by the present invention can be applied to large-area and large-volume concrete structures such as highways, airports, bridges, and dams, providing a solution to the difficulties and pain points that the existing technology cannot achieve all-domain monitoring due to the single-point and local sensor deployment methods. It has good prospects for engineering applications.

In the specific embodiment of the present invention, the optical fiber sensing cables 12 are embedded in the concrete 11 by pre-embedding. Specifically: Before the concrete 11 is poured, the optical fiber sensing cables 12 are laid. After the optical fiber sensing cables 12 are laid, the concrete 11 is poured. After waiting for the concrete 11 to solidify and harden, the initial intelligent concrete with sensing function is generated. Then, the multi-parametric data of the initial intelligent concrete is obtained. Based on the multi-parametric data, the coupling relationship between the multi-parametric data of the initial intelligent concrete and the external state and internal health state is established. Thus, the intelligent concrete 10 is obtained. When in use, the external state and internal health state of the intelligent concrete 10 can be determined based on the real-time data monitored in real time through the intelligent concrete 10 and the coupling relationship, thereby achieving its self-sensing function.

In some embodiments of the present invention, the optical fiber sensing cables 12 comprise vibration optical fiber sensing cable, strain optical fiber sensing cable, temperature optical fiber sensing cable and humidity optical fiber sensing cable.

The concrete 11 can be any one of plain concrete, reinforced concrete, prestressed concrete, etc.

In some embodiments of the present invention, the external state includes external loads and surface conditions. The external loads include environmental loads and operational loads. Environmental loads include but are not limited to wind loads and temperature loads. Operational loads include but are not limited to water loads and traffic loads. Surface conditions include at least one of icing state, melting state and surface damage. The internal health state includes at least one of internal misalignment, internal voids, material aging and loss of prestress.

Among them, optical fiber sensing cables 12 are new type of long-distance, large-capacity, and multi-parameter sensing device. It can be implanted on a large scale inside concrete 11. Not only can the health states of the material itself be learned and analyzed through big data, but also the sensing function can be enabled for all concrete 11, providing a key core data basis for the research of intelligent concrete 10. Optical fiber sensing cables 12 adopt grating sensors written online during the optical fiber preparation process. Up to 100,000 grating sensors can be continuously prepared on a single optical fiber, laying the foundation for the formation of large-capacity sensing optical cables. Optical fiber sensing cables 12 can be encapsulated into different forms of sensing optical cables according to the parameters to be measured, meeting the requirements of multi-parameter sensing such as strain, vibration, temperature, and humidity. Moreover, optical fiber sensing cables 12 are produced through industrialized automatic production and can form long-distance sensing optical cables. The production standard is consistent with that of communication optical cables, and it can be directly embedded in concrete and meet the requirements of long-term reliability.

Among them, the optical fiber sensing cables 12 include multiple gratings, and the multiple gratings are numbered. Responses at different positions of the concrete can be obtained through each grating.

Figure 2:
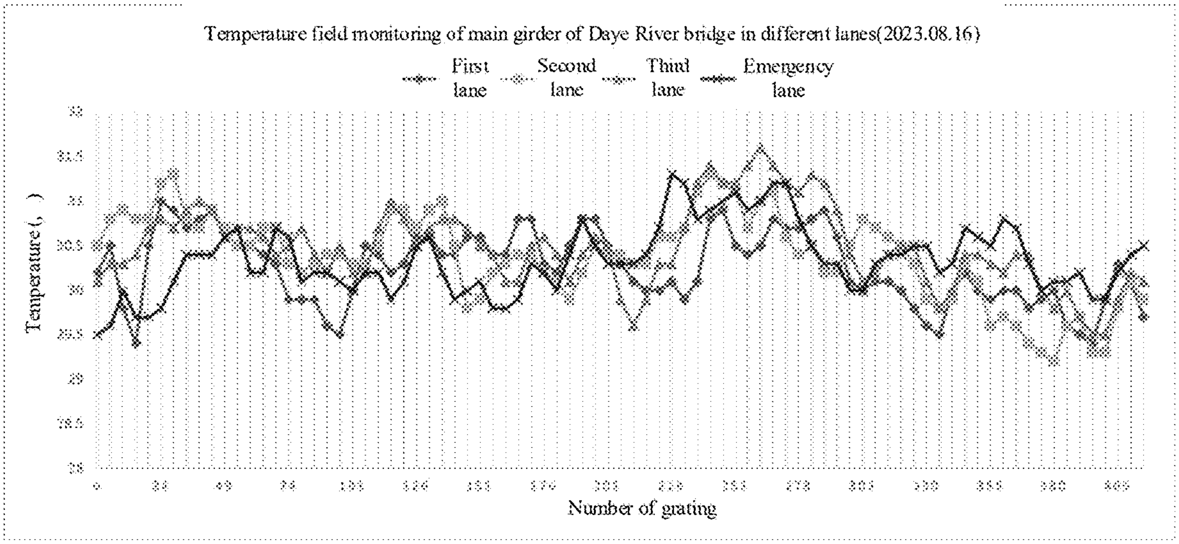
FIG. 2 is a schematic diagram of the all-day temperature field of the main girder of the Daye River Bridge in different lanes on Aug. 16, 2023.
Figure 3:
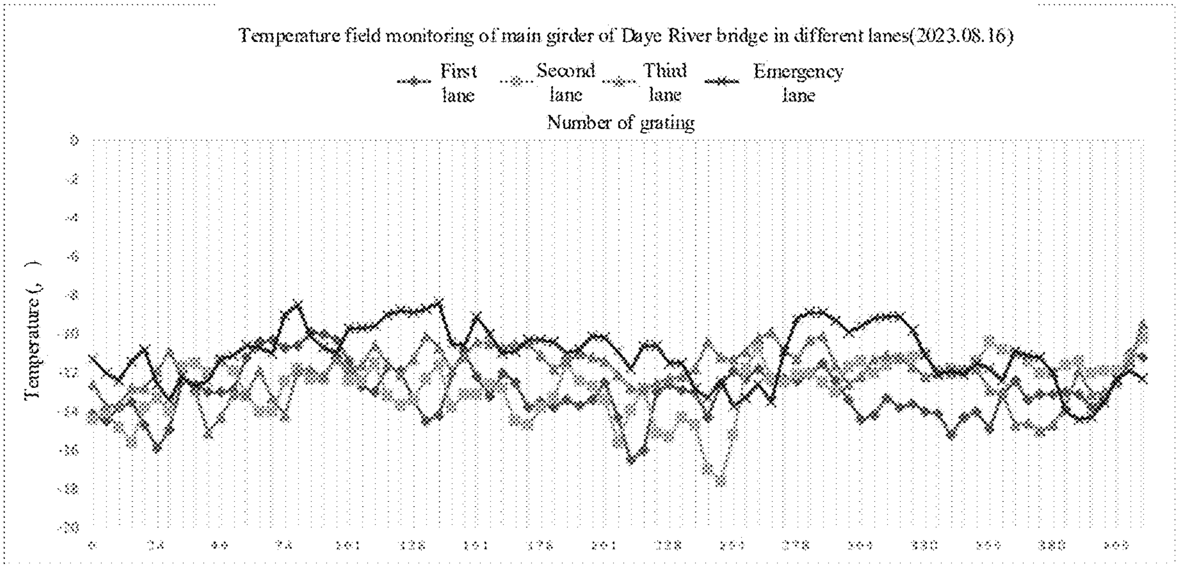
FIG. 3 is a schematic diagram of the all-day temperature field of the main girder of the Daye River Bridge in different lanes on Jan. 15, 2024.

In the specific embodiment of the present invention, as shown in FIG. 2, the optical fiber sensing cable 12 is a temperature sensing cable, the main girder of the Dayehe Bridge constructed based on the intelligent concrete 10 can measure the temperature field of different lanes. The temperature at different positions of each lane can be determined by the number of each grating. Specifically, FIG. 2 shows the all-day temperature field of different lanes of the main girder of the Dayehe Bridge on Aug. 16, 2023, and FIG. 3 shows the all-day temperature field of different lanes of the main girder of the Dayehe Bridge on Jan. 15, 2024.

Since concrete structures such as pavement include multiple layers, for example, the concrete structure includes the bottom base layer and the semi-rigid layer. In order to further enhance the intelligence of intelligent concrete 10, in some embodiments of the present invention, optical fiber sensing cables 12 are implanted respectively at the bottom of bottom base layer, the bottom of the semi-rigid layer, and the middle of the semi-rigid layer. Then, the parameters at these three positions can be obtained respectively to improve the accuracy of the sensing position.

Figure 4:
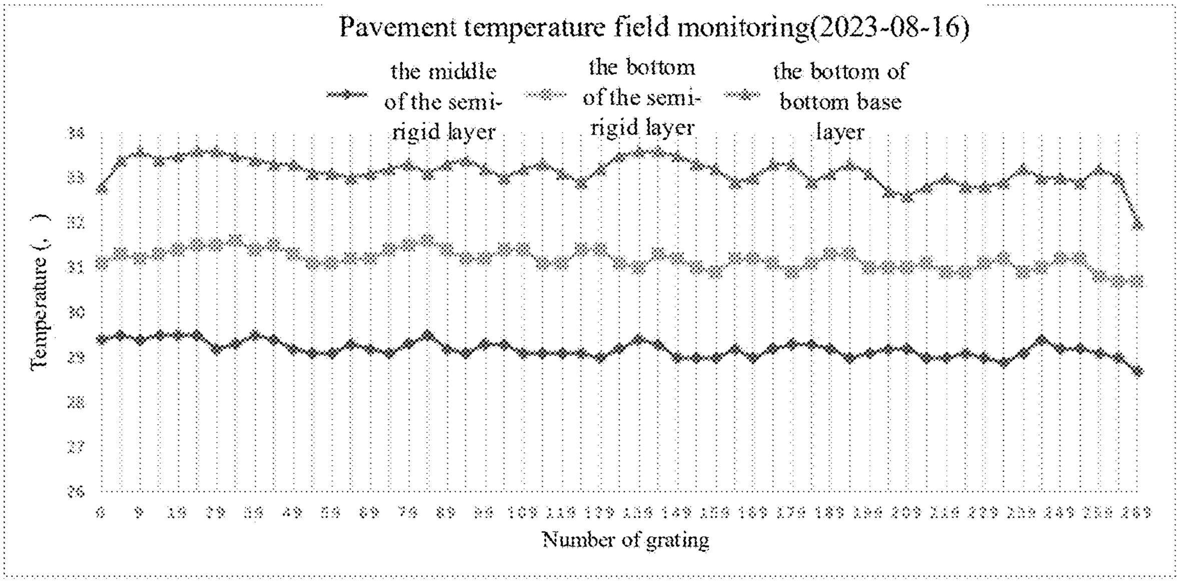
FIG. 4 is a schematic diagram of the all-day temperature field at different structural locations of the main girder of the Daye River Bridge on Aug. 16, 2023.
Figure 5:
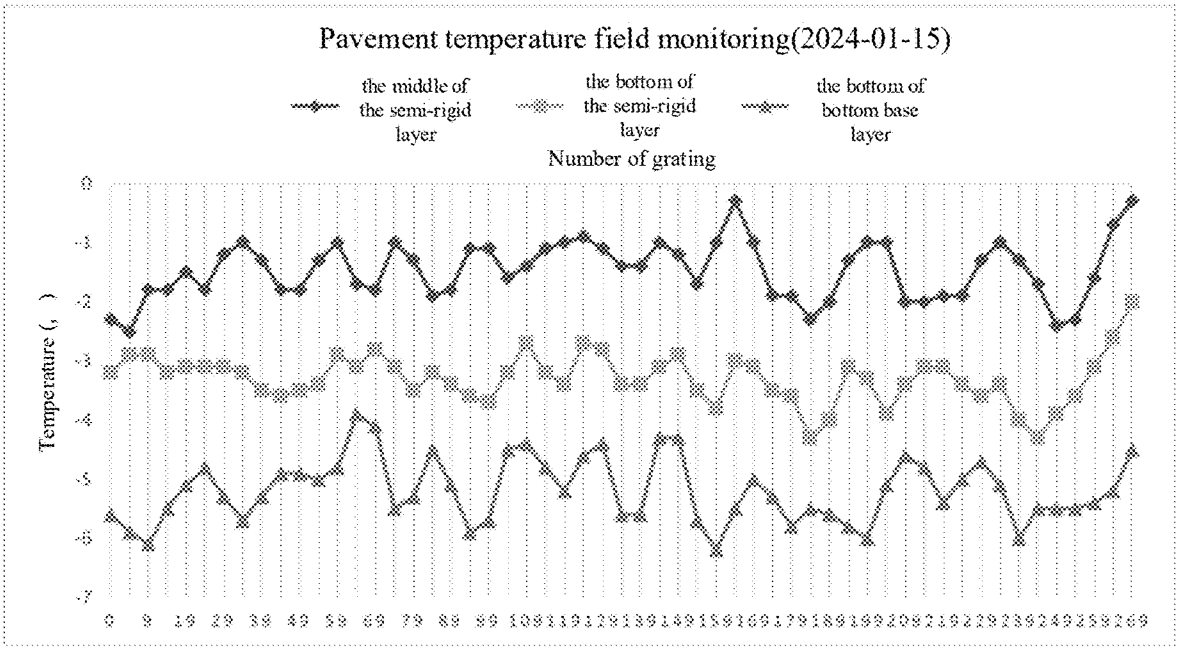
FIG. 5 is a schematic diagram of the all-day temperature field at different structural locations of the main girder of the Daye River Bridge on Jan. 15, 2024.

Specifically, FIG. 4 shows the all-day temperature field at different structural locations of the main girder of the Daye River Bridge on Aug. 16, 2023. FIG. 5 shows the all-day temperature field at different structural locations of the main girder of the Daye River Bridge on Jan. 15, 2024.

Figure 6:
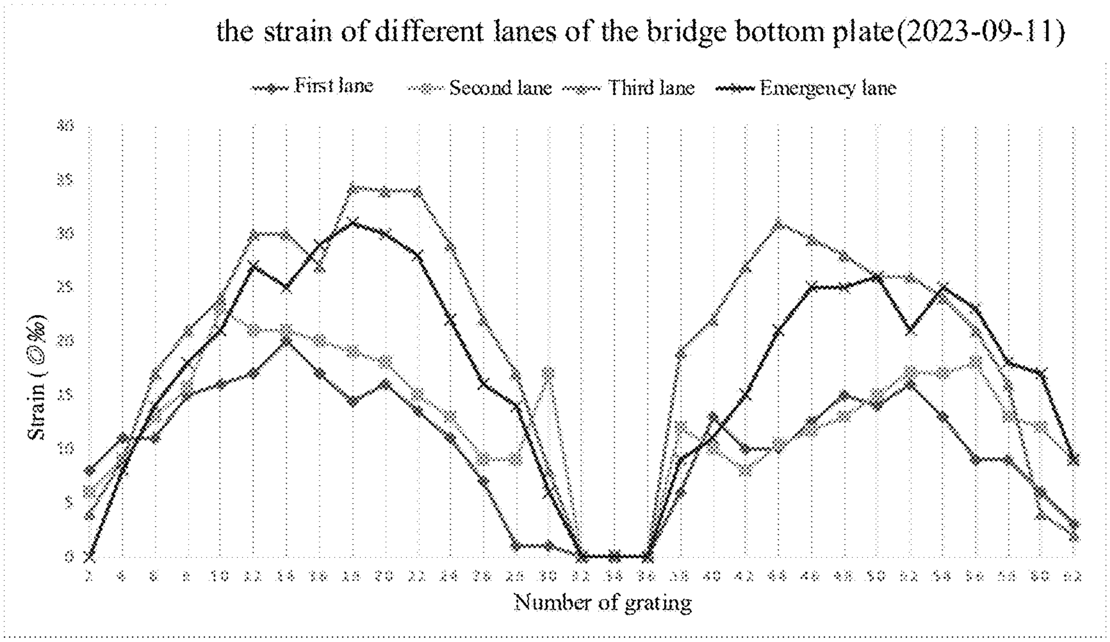
FIG. 6 is a schematic diagram of the strain of different lanes of the bottom plate on Sep. 11, 2023.
Figure 7:
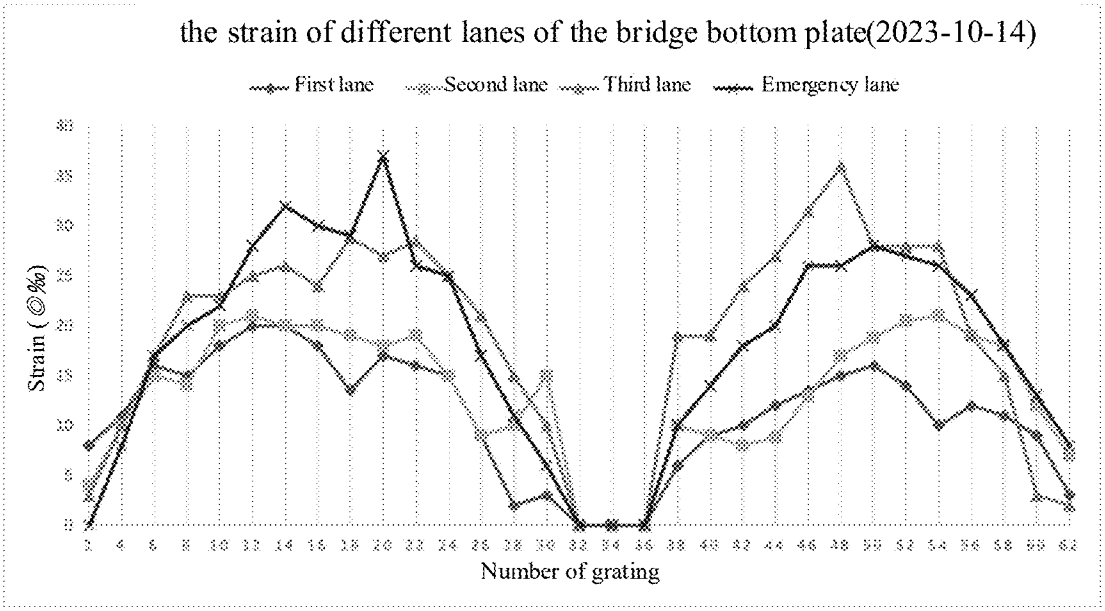
FIG. 7 is a schematic diagram of the strain of different lanes of the bottom plate on Oct. 14, 2013.

In addition to measuring the temperature field, in another specific embodiment of the present invention, the optical fiber sensing cable 12 is a strain sensing cable, which can be laid on the bottom plate layer of the bridge. FIG. 6 shows the strain of different lanes of the bridge bottom plate on Sep. 11, 2023, and FIG. 7 shows the strain of different lanes of the bridge bottom plate on Oct. 14, 2023.

Figure 8:
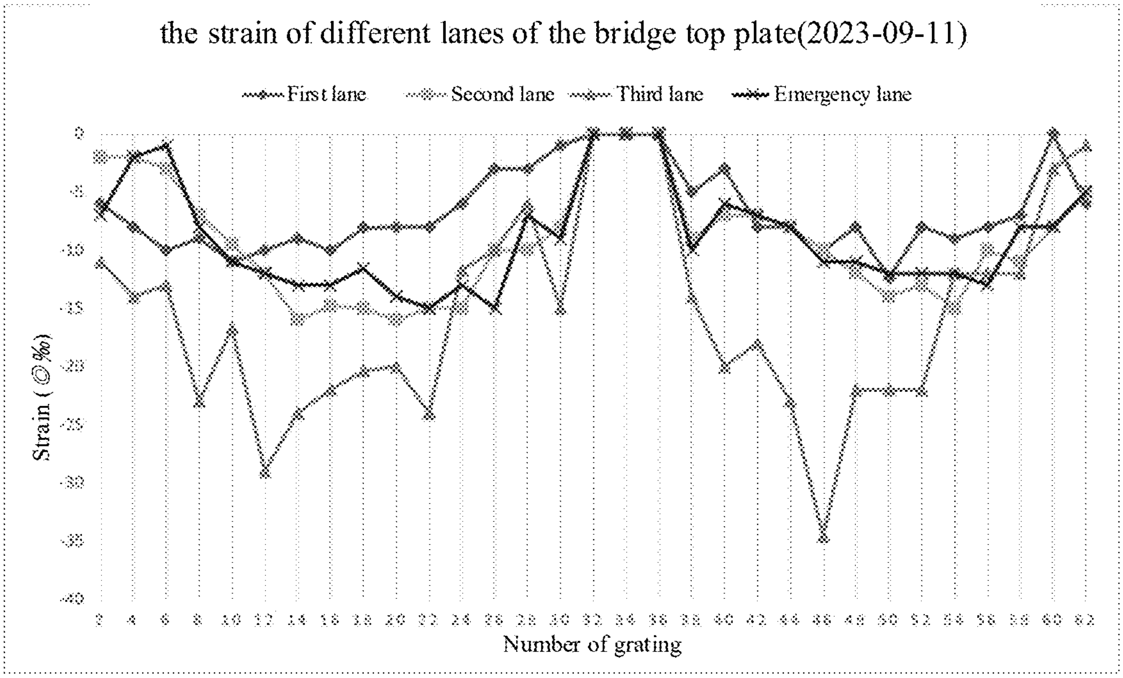
FIG. 8 is a schematic diagram of the strain of different lanes of the bridge top plate on Sep. 11, 2023.
Figure 9:
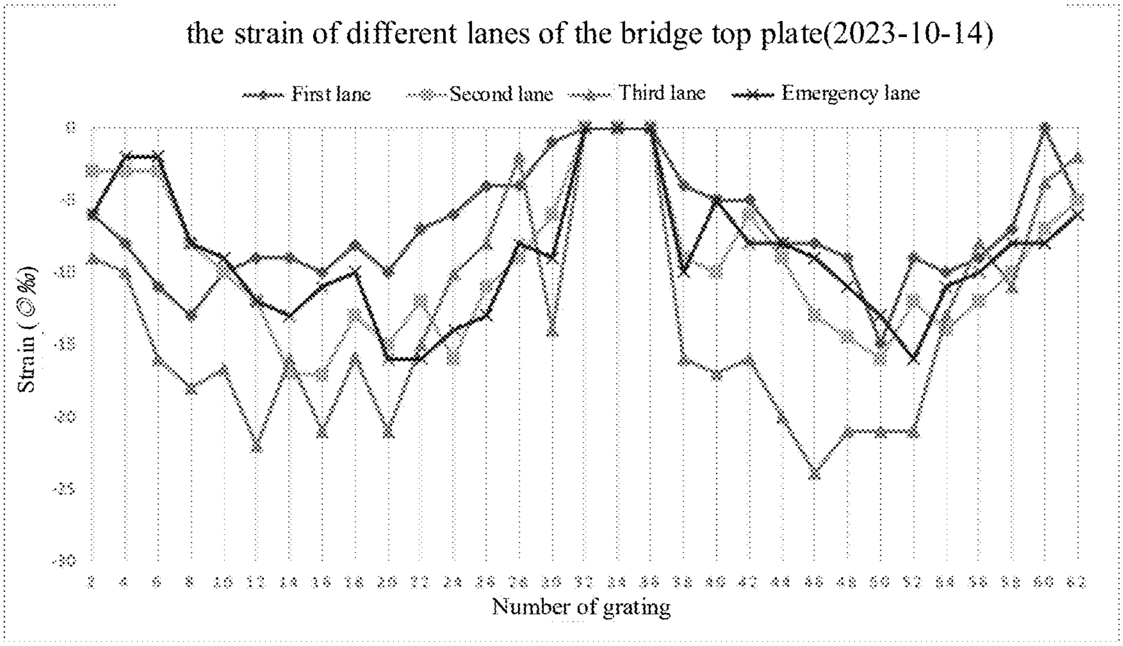
FIG. 9 is a schematic diagram of the strain of different lanes of the bridge top plate on Oct. 14, 2013.

It should be understood that the strain sensing optical cable can also be laid on the top plate of the bridge. FIG. 8 shows the strain of different lanes of the bridge top plate on Sep. 11, 2023, and FIG. 9 shows the strain of different lanes of the bridge top plate on Oct. 14, 2023.

Figure 12:
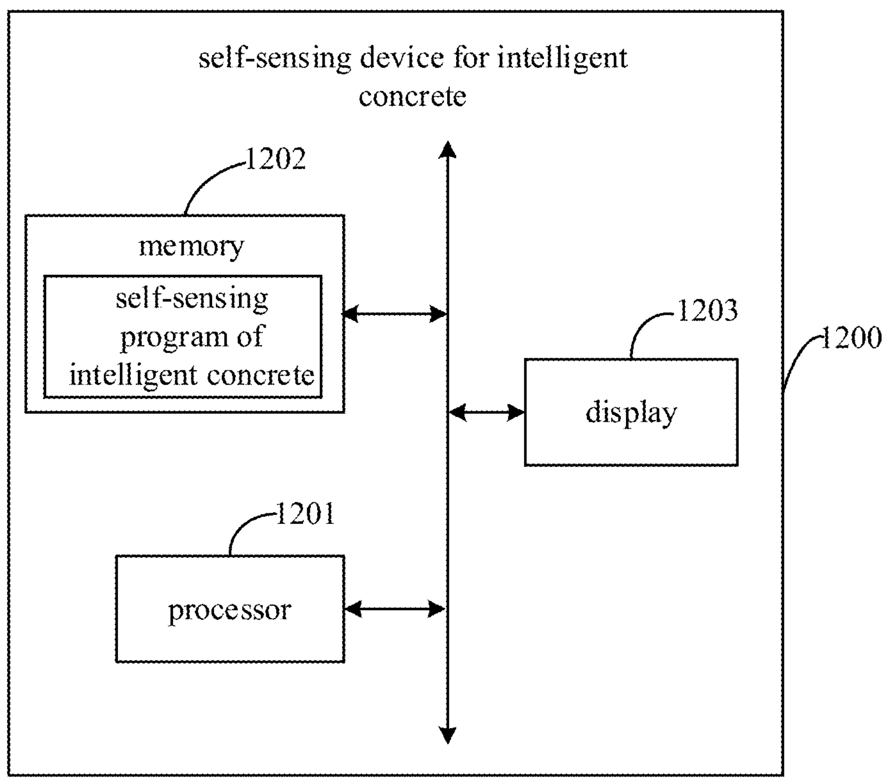
FIG. 12 is a schematic diagram of the structure of the self-sensing device of intelligent concrete provided by the present invention.

The present invention also provides a self-sensing method for intelligent concrete. The self-sensing method for intelligent concrete, illustrated by S1001-S1004, can be implemented on self-sensing device for intelligent concrete 1200 as depicted in FIG. 12. Self-sensing device for intelligent concrete 1200 comprises a demodulator and a data processing module. In S1001, historical global multi-parameter fiber data is acquired via the demodulator. S1002, S1003, and S1004 involve determining the first and second associations, external state, and internal health state using the data processing module.

Figure 10:
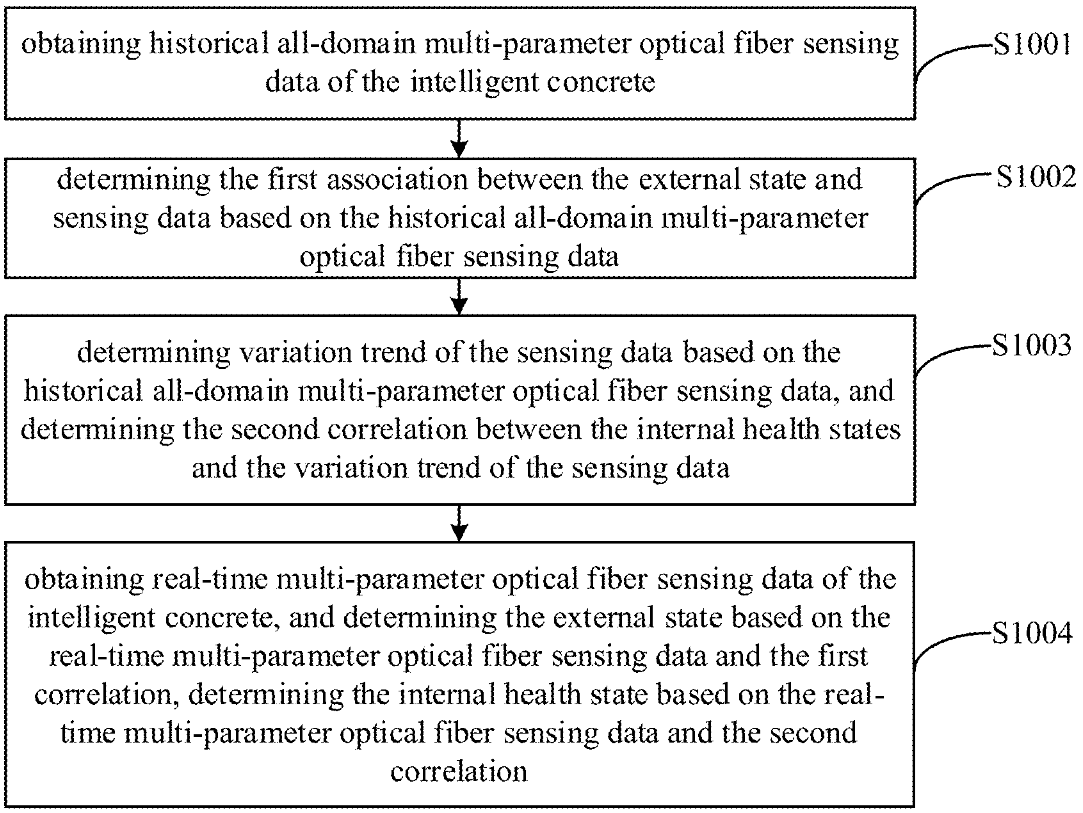
FIG. 10 is a schematic diagram of the self-sensing method for intelligent concrete provided by the present invention.

As shown in FIG. 10, the self-sensing method for intelligent concrete comprises:

S1001, obtaining historical all-domain multi-parameter optical fiber sensing data of the intelligent concrete;

S1002, determining the first association between the external state and sensing data based on the historical all-domain multi-parameter optical fiber sensing data;

S1003, determining variation trend of the sensing data based on the historical all-domain multi-parameter optical fiber sensing data, and determining the second correlation between the internal health states and the variation trend of the sensing data;

S1004, obtaining real-time multi-parameter optical fiber sensing data of the intelligent concrete, and determining the external state based on the real-time multi-parameter optical fiber sensing data and the first correlation, determining the internal health state based on the real-time multi-parameter optical fiber sensing data and the second correlation.

The present invention constructs the first correlation and the second correlation by obtaining the historical all-domain multi-parameter optical fiber sensing data of intelligent concrete, which is equivalent to the learning process of intelligent concrete on the data. Compared with the methods of sample calibration or theoretical derivation in the existing technologies, it considers the influence of the modulus of materials such as sand and cement in the concrete during the hardening and curing processes of intelligent concrete on the data, and is more accurate and rapid.

In some embodiments of the present invention, S1002 comprises:

obtaining historical external state corresponding to the historical all-domain multi-parameter optical fiber sensing data;

determining the first correlation based on the historical all-domain multi-parameter optical fiber sensing data and the historical external state.

Specifically, when the external load is the traffic load, the historical all-domain multi-parameter optical fiber sensing data can be the vibration optical fiber sensing data of a vehicle on the intelligent concrete all-domain domain. Based on the vibration optical fiber sensing data, the traffic load of the vehicle on the intelligent concrete all-domain domain can be known. For example, information such as the real-time changes of the traffic load on the all-domain domain can be known. Compared with the existing technologies of single-point and local ones, the known information is more, broader and more accurate.

In some embodiments of the present invention, when the external state is the frozen state and the first correlation relationship is the all-domain vibration sensing data and the all-domain temperature sensing data, the historical all-domain multi-parameter optical fiber sensing data for determining the first correlation relationship include the historical all-domain vibration sensing data and the historical all-domain temperature sensing data.

Compared with the existing technology that obtains whether the local concrete is in a frozen state through a single temperature sensing data, the embodiment of the present invention determines whether it is in a frozen state through the data of the two dimensions of the all-domain temperature sensing data and the all-domain vibration sensing data, which improves the accuracy of determining the frozen state. And it can achieve the monitoring of the all-domain frozen state.

Figure 11:
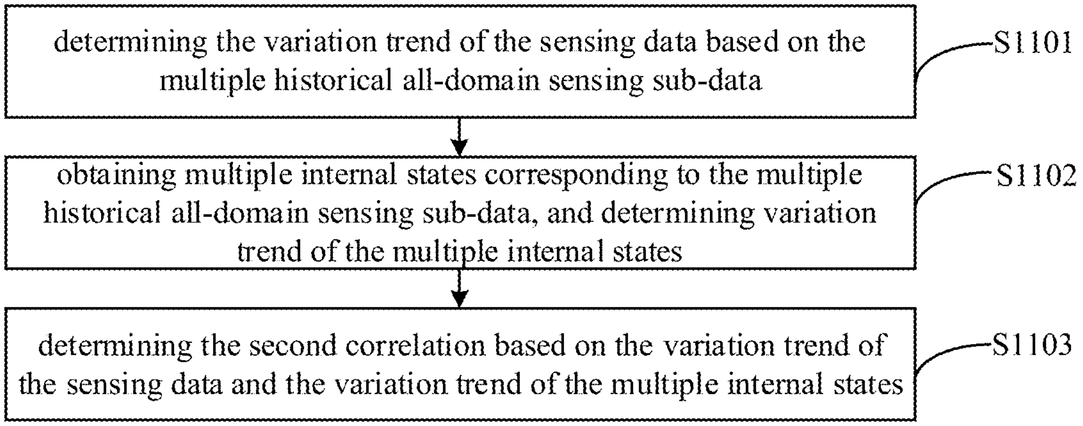
FIG. 11 is a schematic diagram of step S1003 in FIG. 10 of the present invention.

In some embodiments of the present invention, the historical all-domain multi-parameter optical fiber sensing data includes multiple historical all-domain sensing sub-data corresponding to the data sampling interval. As shown in FIG. 11, S1003 comprises:

S1101, determining the variation trend of the sensing data based on the multiple historical all-domain sensing sub-data;

S1102, obtaining multiple internal states corresponding to the multiple historical all-domain sensing sub-data, and determining variation trend of the multiple internal states;

S1103, determining the second correlation based on the variation trend of the sensing data and the variation trend of the multiple internal states.

It should be understood that the process of change in internal health states is a slow and continuous process. For example, the internal structure first becomes dislocation. When the dislocation reaches a certain extent, the internal structure will fracture.

When the change trend of sensing data conforms to a specific pattern, where dislocation initially occurs and subsequently escalates in severity, sensor data indicative of fracture will emerge. Correspondingly, the progression of state changes follows this sequence: initial dislocation, escalating dislocation, and ultimately fracture. For instance, as sensor data progressively transitions from indicating dislocation to indicating fracture, it confirms that the internal health state has deteriorated to a broken condition at this point. Conversely, if no anomalous sensor data appears in the preceding sequence, the internal health state is not determined to be broken. This approach addresses the technical challenge of misjudging internal health status often encountered in traditional disease identification technologies, including those utilizing comparison files.

Therefore, in the embodiments of the present invention, the second correlation relationship is constructed through the changing trend of sensing data and the changing trend of states. Compared with determining the internal health status through the sensing data at a single point, the evolution process and the current stage of the internal health status can be known more accurately, thereby improving the monitoring accuracy of the internal health status.

To further ensure the safety and reliability of intelligent concrete, in some embodiments of the present invention, the self-sensing method for intelligent concrete also comprises:

determining whether the internal health state is a warning states, when the internal health states is a warning states, generate a warning signal.

It should be noted that the above step is determined based on the data processing module.

In the embodiments of the present invention, by generating early warning signals, it can prompt the staff to maintain the intelligent concrete in advance and avoid more serious health problems. While ensuring the safety and reliability of the intelligent concrete, the maintenance cost is reduced.

Among them, the early warning state is the state when the degree of internal dislocation reaches the preset degree of dislocation.

As shown in FIG. 12, the invention also correspondingly provides a self-sensing device for intelligent concrete 1200. The self-sensing device for intelligent concrete 1200 comprises a processor 1201, a memory 1202 and a display 1203. FIG. 12 shows only some of the components of the self-sensing device for intelligent concrete 1200. It should be understood that it is not necessary to implement all of the components shown, and more or fewer components can be implemented instead.

In some embodiments, the processor 1201 can be a Central Processing Unit (CPU), microprocessor or other data processing chip, used to run the program code stored in the memory 1202 or process data, such as the self-sensing method for intelligent concrete in the present invention.

In some embodiments, the processor 1201 can be a single server or a server group. The server group can be centralized or distributed. In some embodiments, the processor 1201 can be local or remote. In some embodiments, the processor 1201 can be implemented on a cloud platform. In one embodiment, the cloud platform can include private clouds, public clouds, hybrid clouds, community clouds, distributed clouds, internal clouds, multi-clouds, etc., or any combination of the above.

In some embodiments, the memory 1202 can be the internal storage unit of the self-sensing device for intelligent concrete 1200 of intelligent concrete, such as the hard disk or memory of the self-sensing device for intelligent concrete 1200 of intelligent concrete. In other embodiments, the memory 1202 can also be the external storage device of the self-sensing device for intelligent concrete 1200 of intelligent concrete, such as the plug-in hard disk, smart media card (SMC), secure digital (SD) card, flash card, etc. equipped on the self-sensing device for intelligent concrete 1200 of intelligent concrete.

Further, the memory 1202 can also include both the internal storage unit of the self-sensing device for intelligent concrete 1200 of the intelligent concrete and the external storage device. The memory 1202 is used to store the application software and various types of data for installing the self-sensing device for intelligent concrete 1200 of the intelligent concrete.

In some embodiments, the display 1203 can be an LED display, a liquid crystal display, a touchscreen liquid crystal display, and an OLED (Organic Light-Emitting Diode) touchscreen, etc. The display 1203 is used to display the information of the self-sensing device for intelligent concrete 1200 of the intelligent concrete and to display the visual user interface. The components 1201-1203 of the self-sensing device for intelligent concrete 1200 of the intelligent concrete communicate with each other through the system bus.

In some embodiments of the present invention, when the processor 1201 executes the self-sensing program of intelligent concrete in the memory 1202, the following steps can be achieved:

obtaining historical all-domain multi-parameter optical fiber sensing data of the intelligent concrete;

determining the first association between the external state and sensing data based on the historical all-domain multi-parameter optical fiber sensing data;

determining variation trend of the sensing data based on the historical all-domain multi-parameter optical fiber sensing data, and determining the second correlation between the internal health states and the variation trend of the sensing data;

obtaining real-time multi-parameter optical fiber sensing data of the intelligent concrete, and determining the external state based on the real-time multi-parameter optical fiber sensing data and the first correlation, determining the internal health state based on the real-time multi-parameter optical fiber sensing data and the second correlation.

Specifically, during program execution, the corresponding hardware implementations can be invoked. For instance, the demodulation instrument can be activated for data acquisition, and the data processing module can be utilized to determine the initial association, secondary association, internal health state, and internal health state.

It should be understood that when processor 1201 executes the self-sensing program of intelligent concrete in memory 1202, in addition to the above functions, other functions can also be achieved. For details, please refer to the description of the corresponding method embodiments mentioned earlier.

Further, the present invention embodiment does not specifically limit the type of the self-sensing device for intelligent concrete 1200 of the intelligent concrete mentioned. The self-sensing device for intelligent concrete 1200 of the intelligent concrete can be a portable self-sensing device such as a mobile phone, tablet, personal digital assistant (PDA), wearable device, laptop, etc. The exemplary embodiments of the portable self-sensing device of the intelligent concrete include but are not limited to the portable self-sensing device equipped with IOS, Android, Microsoft or other operating systems. The above-mentioned portable self-sensing device of the intelligent concrete can also be other portable self-sensing devices, such as laptops with touch-sensitive surfaces (such as touch panels), etc. It should also be understood that in some other embodiments of the present invention, the self-sensing device for intelligent concrete 1200 of the intelligent concrete can also not be a portable self-sensing device of the intelligent concrete, but rather a desktop computer with a touch-sensitive surface (such as a touch panel).

Correspondingly, the embodiments of the present invention also provide a computer-readable storage medium. The computer-readable storage medium is used to store computer-readable programs or instructions. When the programs or instructions are executed by the processor, the steps or functions in the self-sensingness method of intelligent concrete provided by the above-mentioned embodiments of the method can be achieved.

Those skilled in the art can understand that all or some of the processes for implementing the above-mentioned embodied methods can be accomplished by instructing the relevant hardware (such as processors, controllers, etc.) through computer programs, and the computer programs can be stored in computer-readable storage media. Among them, the computer-readable storage media are disks, optical discs, read-only memory, random access memory, etc.

The above has provided a detailed introduction to an intelligent concrete, self-sensing method for intelligent concrete, device and storage medium provided by the present invention. In this article, specific examples are applied to elaborate on the principle and implementation method of the present invention. The description of the above implementation examples is only used to help understand the method of the present invention and its core idea. At the same time, for technicians in this field, based on the idea of the present invention, there will be changes in the specific implementation methods and application scopes. To sum up, the content of this specification should not be understood as a limitation of the present invention.

What is claimed is:

1. A self-sensing method for intelligent concrete, comprising:

providing an intelligent concrete including concrete and optical fiber sensing cables embedded in the concrete; wherein before the concrete is poured, the optical fiber sensing cables are laid, after the optical fiber sensing cables are laid, the concrete is poured, after waiting for the concrete to solidify and harden, thereby an initial intelligent concrete with sensing function is generated, then, a multi-parametric data of the initial intelligent concrete is obtained, a coupling relationship between the multi-parametric data of the initial intelligent concrete, an external state of the initial intelligent concrete, and an internal health state of the initial intelligent concrete is established based on the multi-parametric data, thereby the intelligent concrete is obtained; and the intelligent concrete is used for an all-domain self-sensing of the external state and the internal health state, the optical fiber sensing cables include a vibration optical fiber sensing cable, a strain optical fiber sensing cable, a temperature optical fiber sensing cable and a humidity optical fiber sensing cable;

obtaining historical all-domain multi-parameter optical fiber sensing data of the intelligent concrete;

determining a first correlation between the external state and sensing data based on the historical all-domain multi-parameter optical fiber sensing data;

determining a variation trend of the sensing data based on the historical all-domain multi-parameter optical fiber sensing data, and determining a second correlation between the internal health state and the variation trend of the sensing data; and obtaining real-time multi-parameter optical fiber sensing data of the intelligent concrete, and determining the external state based on the real-time multi-parameter optical fiber sensing data and the first correlation, and determining the internal health state based on the real-time multi-parameter optical fiber sensing data and the second correlation;

wherein the external state includes external loads and surface conditions, the external loads include at least one of water load, traffic load, wind load and temperature load, the surface conditions include at least one of icing state, melting state and surface damage, and the internal health state includes at least one of internal dislocation, internal void, material aging and loss of prestress;

wherein the first correlation is a correlation between an all-domain vibration sensing data, an all-domain temperature sensing data and a freezing state; and wherein the historical all-domain multi-parameter optical fiber sensing data includes multiple historical all-domain sensing sub-data corresponding to a data sampling interval, and the determining the variation trend of the sensing data based on the historical all-domain multi-parameter optical fiber sensing data, and determining the second correlation between the internal health state and the variation trend of the sensing data comprises:

determining the variation trend of the sensing data based on the multiple historical all-domain sensing sub-data;

obtaining multiple internal states corresponding to the multiple historical all-domain sensing sub-data, and determining a variation trend of the multiple internal states; and determining the second correlation based on the variation trend of the sensing data and the variation trend of the multiple internal states;

wherein the self-sensing method for intelligent concrete further comprises determining whether the internal health state is a warning state, in response to the internal health state being a warning state, generating, by a processor, a warning signal, the warning signal is configured to prompt a staff to maintain the intelligent concrete, thereby avoiding more serious health problems and reducing maintenance cost of the intelligent concrete.

2. The self-sensing method for intelligent concrete of claim 1, wherein determining the first correlation between the external state and sensing data based on the historical all-domain multi-parameter optical fiber sensing data comprises:

obtaining historical external state corresponding to the historical all-domain multi-parameter optical fiber sensing data;

determining the first correlation based on the historical all-domain multi-parameter optical fiber sensing data and the historical external state.

3. A self-sensing device of intelligent concrete, including a memory and a processor, wherein, the memory is used for storing programs;

the processor, coupled with the memory, is used to execute the programs stored in the memory to implement the steps in the self-sensing method for intelligent concrete described in the claim 1.

4. A computer-readable storage medium is used to store a computer-readable program or instruction that, and when the programs or instructions are executed by the processor, the steps in the self-sensing method for intelligent concrete described in the claim 1.

* * * * *